United States Patent
Ito et al.

(10) Patent No.: US 7,577,417 B2
(45) Date of Patent: Aug. 18, 2009

(54) MOBILE TERMINAL

(75) Inventors: Tamotsu Ito, Ayase (JP); Katsuki Ikuta, Hachioji (JP); Masayoshi Kuroda, Yokohama (JP); Tsukasa Hasegawa, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 451 days.

(21) Appl. No.: 11/480,971

(22) Filed: Jul. 6, 2006

(65) Prior Publication Data

US 2006/0252393 A1 Nov. 9, 2006

Related U.S. Application Data

(63) Continuation of application No. 10/405,368, filed on Apr. 3, 2003, now abandoned.

(30) Foreign Application Priority Data

Apr. 3, 2002 (JP) .............................. 2002-100735

(51) Int. Cl.
   *H04B 1/26* (2006.01)
   *H04M 1/00* (2006.01)
(52) U.S. Cl. .................. 455/313; 455/196.1; 455/575.1
(58) Field of Classification Search ................ 455/566, 455/574, 575.1, 343.1, 343.2, 343.3, 343.4, 455/575.3, 277, 260, 313, 196.1, 255
   See application file for complete search history.

(56) References Cited

U.S. PATENT DOCUMENTS

| | | | |
|---|---|---|---|
| 5,479,645 A | 12/1995 | Sakai et al. | |
| 5,881,372 A * | 3/1999 | Kruys | ........................ 455/113 |
| 6,263,449 B1 | 7/2001 | Motohashi | |
| 6,484,041 B1 | 11/2002 | Aho et al. | |
| 6,995,716 B2 * | 2/2006 | Hwang et al. | ............... 343/702 |
| 7,386,332 B2 * | 6/2008 | Masuda et al. | ........... 455/575.4 |
| 2002/0029352 A1 | 3/2002 | Borkar et al. | |
| 2002/0040442 A1 | 4/2002 | Ishidera | |
| 2002/0173344 A1 | 11/2002 | Cupps et al. | |

FOREIGN PATENT DOCUMENTS

| | | | |
|---|---|---|---|
| GB | 2 297 661 A * | 7/1996 | |
| JP | 03-057007 | 7/1989 | |
| JP | 05-108195 | 4/1993 | |
| JP | 09-026832 | 7/1995 | |
| JP | 11-73237 | 3/1999 | |
| JP | 11-085723 | 3/1999 | |
| JP | 11-205168 | 7/1999 | |
| JP | 2000-112544 | 4/2000 | |
| JP | 2000-148475 | 5/2000 | |
| JP | 2000-261852 | 9/2000 | |
| JP | 2002-084574 | 3/2002 | |
| JP | 2002-207530 | 7/2002 | |
| WO | WO 01/98879 A1 | 12/2001 | |

* cited by examiner

*Primary Examiner*—Sonny Trinh
(74) *Attorney, Agent, or Firm*—Brundidge & Stanger, P.C.

(57) ABSTRACT

There is provided a cellular phone taking into consideration enhancement in processing speed and reduction in current consumption, and the cellular phone comprises a processing unit capable of executing plural kinds of processing, an oscillator for generating a clock signal to be fed to the processing unit, and a clock controller for converting the frequency of the clock signal received from the oscillator, wherein the clock controller changes the frequency of the clock signal for each of the plural kinds of the processing in response to the control by the central processing unit.

7 Claims, 5 Drawing Sheets

MOBILE TERMINAL

CROSS-REFERENCE TO RELATED APPLICATIONS

This is a continuation application of U.S. application Ser. No. 10/405,368 filed Apr. 3, 2003, now abandoned, the subject matter of which is incorporated herein by reference. This application claims the benefit of Japanese Patent Application 2002-100735 filed on Apr. 3, 2002, the disclosure of which is incorporated herein by reference.

BACKGROUND OF THE INVENTION

The present invention relates to a cellular phone comprising a central processing unit (CPU).

A hand-held terminal or mobile terminal, for switching the frequency of a clock signal delivered from the side of an application program, is disclosed in JP-A NO. 73237/1999 (Heisei 11).

Further, in JP-A No. 148475/2000, there is disclosed a computer for a mobile unit, capable of switching a clock frequency to a high-speed mode frequency higher than a normal frequency when conditions, such as power source voltage, ambient temperature, and so forth, are satisfied.

In the case of the conventional technology described above, speed control of a clock signal has been implemented by an application program or has been dependent on the conditions such as power source voltage, ambient temperature, and so forth, so that there is no room for interposition of the will of a user in switching the speed of the clock signal. Further, if the CPU is driven at a high frequency, there has been a tendency toward an increase in current consumption although a processing speed is enhanced. With a cellular phone, in particular, since its battery capacity is small, there has been a risk of premature depletion of the battery capacity occurring when the clock signal has been automatically switched over to the high-speed side without knowledge of the user.

SUMMARY OF THE INVENTION

To attain both enhancement in processing speed and reduction in current consumption, it is an object of the invention to provide a mobile terminal comprising clock control means capable of changing the frequency of a clock signal received from an oscillator under control by a central processing unit, and converting an operation frequency of the central processing unit to a different frequency, wherein a clock signal at the different frequency as converted by the clock control means becomes a clock signal of the central processing unit.

Other and further objects, features and advantages of the invention will appear more fully from the following description.

DETAILED DESCRIPTION OF THE PREFERRED EMBODIMENTS

Figure 1:
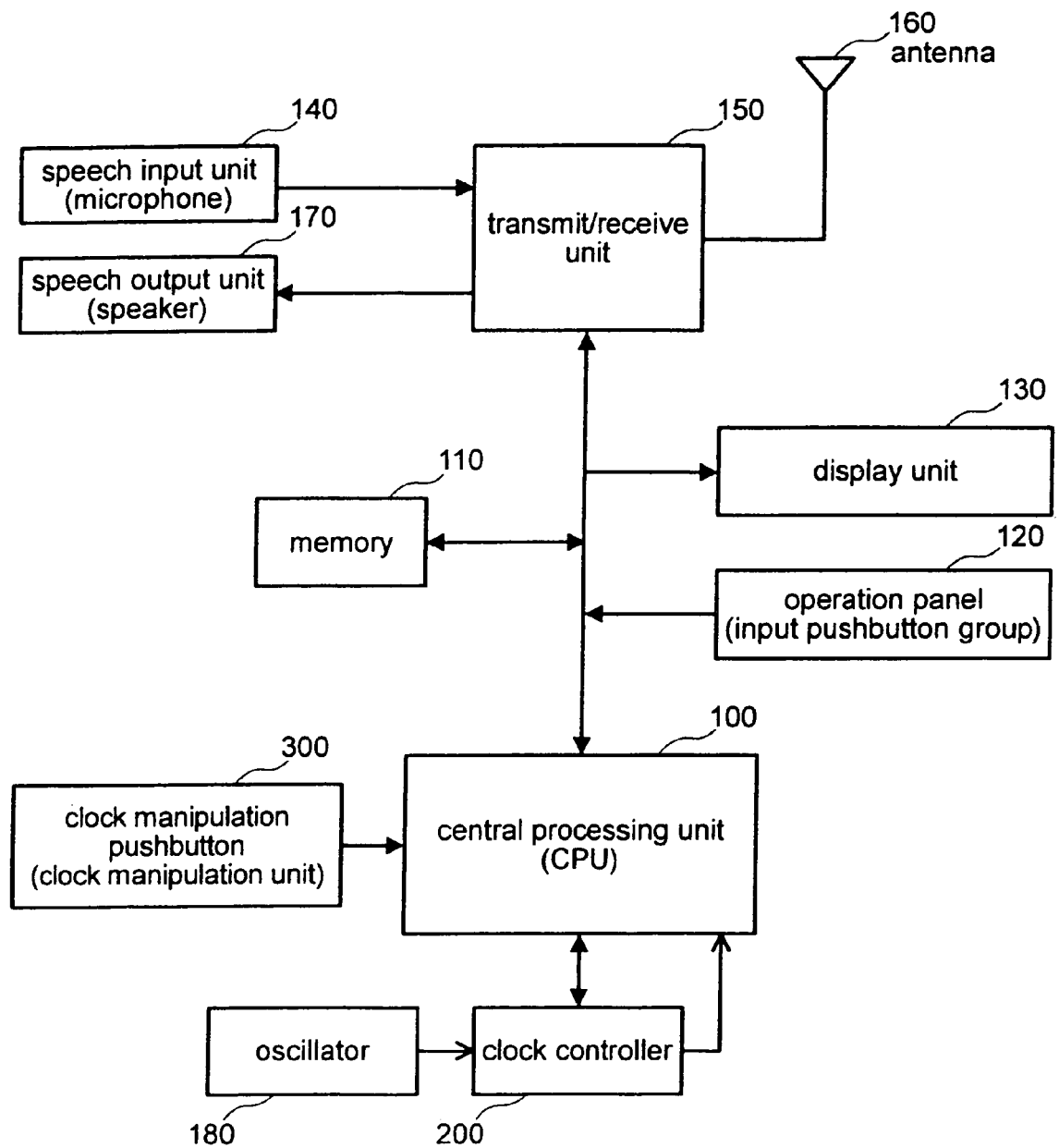
FIG. 1 is a block diagram showing the configuration of a first embodiment of a cellular phone according to the invention.

A first embodiment of a cellular phone according to the invention is described hereinafter with reference to FIGS. 1 and 5. FIG. 1 is a block diagram showing the internal configuration of the cellular phone according to the first embodiment.

A central processing unit (CPU) 100 controls the operation of the cellular phone in accordance with a control program stored in a memory 110. The CPU 100 performs operation in accordance with an input pushbutton as pressed via an operation panel (input pushbutton group) 120, executing processing in response to the input pushbutton as pressed.

Upon dialing, a telephone number as inputted from the operation panel 120 is shown on a display unit 130, a speech signal delivered from a speech input unit (microphone) 140 is sent out in the form of radio waves from an antenna 160 to the outside via a transmit/receive unit 150 in accordance with a transmission directive delivered from the operation panel 120.

At the time of signal reception, radio waves from the outside are received by the antenna 160, and upon recognition by the transmit/receive unit 150 that the radio waves received are radio waves corresponding to a telephone number dedicated to the present cellular phone, speech is delivered from a speech output unit (speaker) 170.

The CPU 100 receives a clock signal from an oscillator 180 through the intermediary of a clock controller 200. Because an operation frequency of the CPU 100 is dependent on the frequency of the clock signal as received, a processing speed of the CPU 100 is regulated by the frequency of the clock signal. The clock controller 200 converts the frequency of the clock signal into any suitable frequency by use of a PLL (Phase Locked Loop) circuit under control by the CPU 100, and the clock signal is delivered to the CPU 100 as a clock signal of the CPU 100. The frequency of the clock signal delivered to the CPU 100 becomes the operation frequency of the CPU 100.

Figure 5:
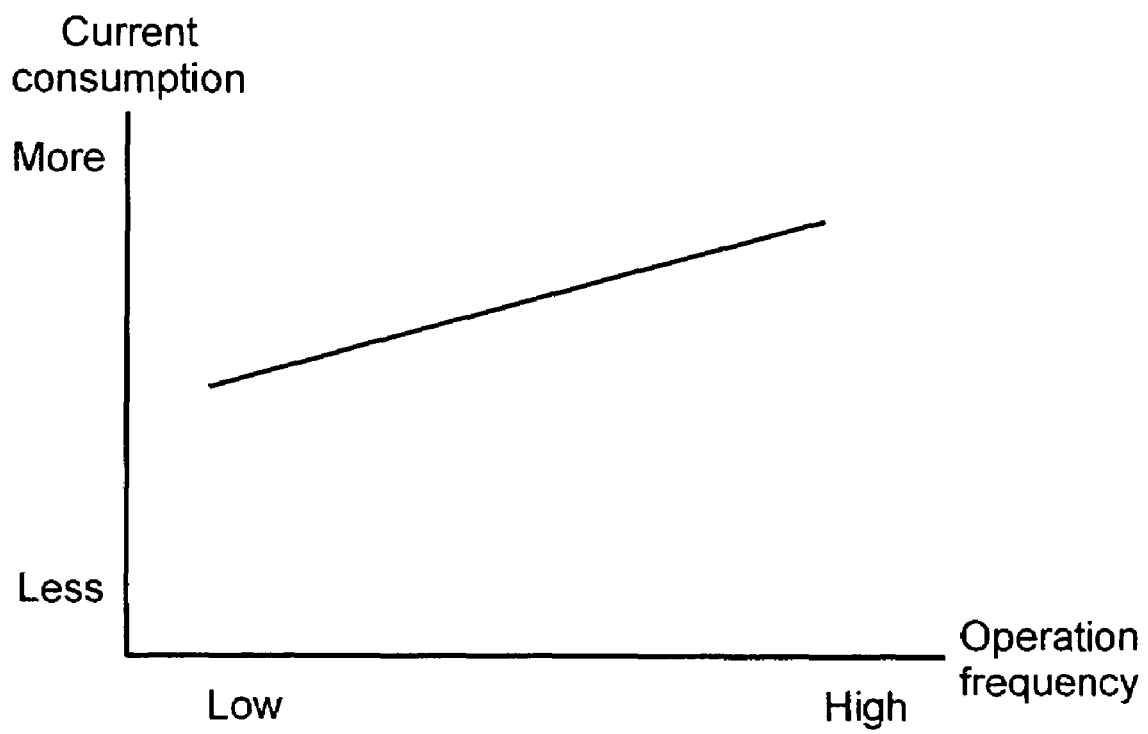
FIG. 5 is a graph showing the relationship between an operation frequency of a central processing unit of the cellular phone according to the first to fourth embodiments, respectively, and current consumption.

FIG. 5 is a graph showing the relationship between the operation frequency and current consumption. In proportion as the frequency of the clock signal is changed to a higher frequency, the operation frequency of the CPU 100 becomes higher, thereby enhancing the processing speed of the CPU 100 although current consumption increases.

With the present embodiment, when executing a specific processing, the frequency of the clock signal of the CPU 100 is caused to change to a higher frequency, thereby enhancing the processing speed. Upon completion of the execution of the specific processing, the frequency of the clock signal of the CPU 100 is caused to change to a lower frequency, thereby reducing current consumption. In the initial condition at the time when power is turned on, the frequency of the clock signal of the CPU 100 is set to a low frequency in order to reduce current consumption.

Herein, the specific processing refers to, for example, processing for image decoding, address retrieval processing, and application processing such as kana-kanji conversion processing used in entering characters. These processing often have effects on the response of the user.

With the present embodiment, the user can change the operation frequency of the CPU 100 by changing the output frequency of the clock controller 200 at will with the use of a clock manipulation unit 300 connected with the CPU 100.

If the user enters a request for change via the clock manipulation unit 300, the CPU 100 receives an input from the clock manipulation unit 300, and controls the clock controller 200, thereby controlling a clock frequency to be fed to the CPU 100. That is, in response to the input from the clock manipulation unit 300, the frequency of the clock signal to be fed to the CPU 100 is set.

Further, with the present embodiment, depending on an application to be used, and use environments, the user can change the frequency of the clock signal in every processing. For example, if the user wants to increase the processing speed of the CPU 100, the frequency of the clock signal can be raised, and if the user wants to reduce current consumption, the frequency of the clock signal can be changed to a lower frequency. By virtue of such a function as described, the user can set the frequency of the clock signal as appropriate at will depending on the user's use environments, such as the user' desire to execute high speed processing, or to use the cellular phone for many hours, the amount of the actual battery capacity that remains in a battery being small, and so forth, so that operability can be enhanced.

In FIG. 1, the clock manipulation unit 300 is shown as a single pushbutton (clock manipulation pushbutton), but may be made up of a plurality of keys instead. In order to implement the clock manipulation unit 300 with the single pushbutton, for example, the lowest frequency is set as the initial condition of the frequency of the clock signal, thereby carrying out control such that every time when the single pushbutton is once operated, the frequency of the clock signal of the CPU 100 is changed to sequentially higher frequencies by stages. The frequency is changed cyclically, and if the frequency of the clock signal of the CPU 100 is changed to the highest frequency, upon operation of the single pushbutton the next time, the frequency of the clock signal of the CPU 100 reverts to the lowest frequency. Thus, every time when the single pushbutton is operated, the output frequency of the clock controller 200 can be changed, thereby enabling the operation frequency of the CPU 100 to be changed.

The CPU 100 causes the display unit 130 to display a numerical value of the frequency after changed in such a way as to explicitly advise the user of the frequency of the clock signal after changed. Since it is sufficient for such display to indicate simply which stage the processing speed of the CPU 100 is in, indication of a specific numerical value of the frequency is not necessarily required. Numbers to indicate respective stages, such as 1, 2, 3 . . . , or characters such as high, middle, low, etc. may be displayed. Alternatively, the respective stages of the processing speed may be displayed in number of stars, exhibiting one star on the display unit 130 for the lowest speed, increasing the number of stars exhibited on the display unit 130 in ascending order of the stage. Otherwise, the status of the processing speed may be displayed with the use of a bar graph, icons, and so forth.

Further, for changing the output frequency of the clock controller 200 at the user's will, there may be adopted a method whereby an operation menu directing change of the frequency of the clock signal is caused to be displayed on the display unit 130 without the use of the clock manipulation pushbutton, and the user selects or directs at will the output frequency of the clock controller 200 by use of the operation panel 120, thereby changing the operation frequency of the CPU 100. In such a case, the operation panel 120 functions as the clock manipulation unit 300, so that the clock manipulation unit 300 can be omitted.

Figure 2:
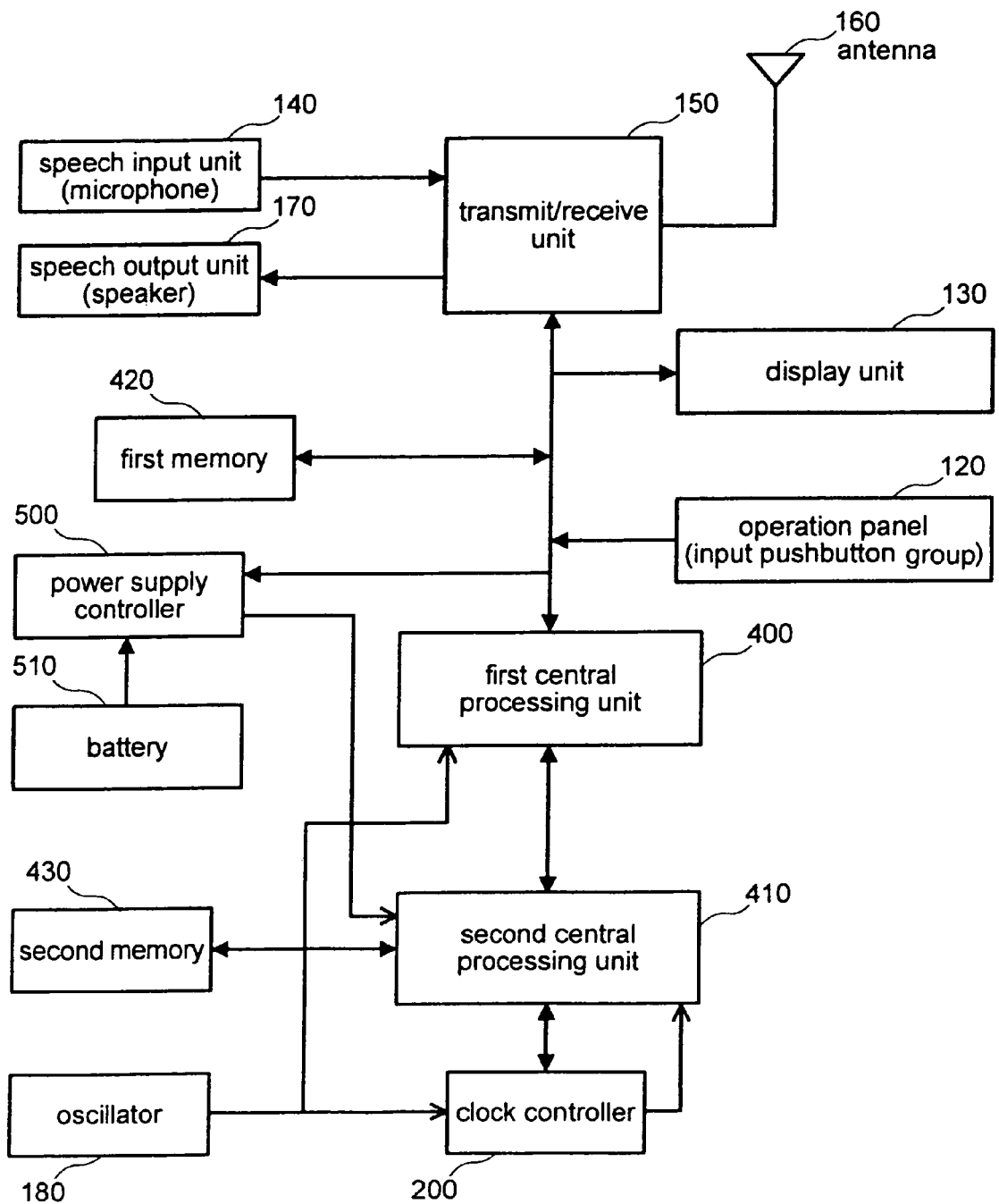
FIG. 2 is a block diagram showing the configuration of a second embodiment of a cellular phone according to the invention.

Now, a second embodiment of a cellular phone according to the invention is described hereinafter with reference to FIG. 2. FIG. 2 is a block diagram showing the internal configuration of the cellular phone according to the second embodiment.

With the present embodiment, a central processing unit (CPU) is made up so as to be divided into a first central processing unit 400 concerned with transmit/receive of signals, and a second central processing unit 410 handling processing that has effects on the response of a user. In FIG. 2, blocks denoted by the same reference numerals as those in FIG. 1 correspond to those blocks of the first embodiment, having the same functions.

The first central processing unit 400 controls operation concerned with transmit/receive by the cellular phone in accordance with a control program stored in a first memory 420, and the second central processing unit 410 controls operation concerned with processing that has effects on the response of a user in accordance with a control program stored in a second memory 430. More specifically, the second central processing unit 410 controls operation concerned with processing of an application program.

A clock signal from an oscillator 180 is directly delivered to the first central processing unit 400 as a clock signal. Meanwhile, a clock signal at any suitable frequency converted by control of the second central processing unit 410 is delivered to the second central processing unit 410 through the intermediary of a clock controller 200.

With such a configuration as described, when executing a specific processing, the frequency of the clock signal delivered to the second central processing unit 410 can be changed to a high frequency, thereby enhancing a processing speed, and upon completion of execution of the processing that has effects on the response of the user, the frequency of the clock signal delivered to the second central processing unit 410 can be changed to a low frequency, thereby reducing current consumption.

For example, during a standby (waiting) period for communications by the cellular phone, the first central processing unit 400 is in intermittent operation to receive radio waves from the outside via an antenna 160, executing processing for recognition by the transmit/receive unit 150 that the radio waves received are radio waves corresponding to a telephone number dedicated to the present cellular phone. In this case, the frequency of the clock signal delivered to the second central processing unit 410 is changed to a low frequency to thereby reduce current consumption. As shown FIG. 5, the relationship between an operation frequency and current consumption is such that in proportion as the operation frequency becomes higher, the current consumption increases while in proportion as the operation frequency becomes lower, the current consumption decreases.

The cellular phone shown in FIG. 2 further comprises a power supply controller 500. The power supply controller 500 controls power to be supplied from a battery 510 to the second central processing unit 410 in response to control by the first central processing unit 400. For example, during a standby (waiting) period for communications by the cellular phone or upon completion of the processing by the second central processing unit 410, the power supply controller 500 can turn off power to be supplied to the second central processing unit 410 in response to control by the first central processing unit 400. Since the second central processing unit 410 handles application, its power consumption at the time of processing is large, and consequently, effective saving in power can be attained by controlling the power supplied.

Next, a third embodiment of a cellular phone according to the invention is described hereinafter with reference to FIG. 3.

Figure 3:
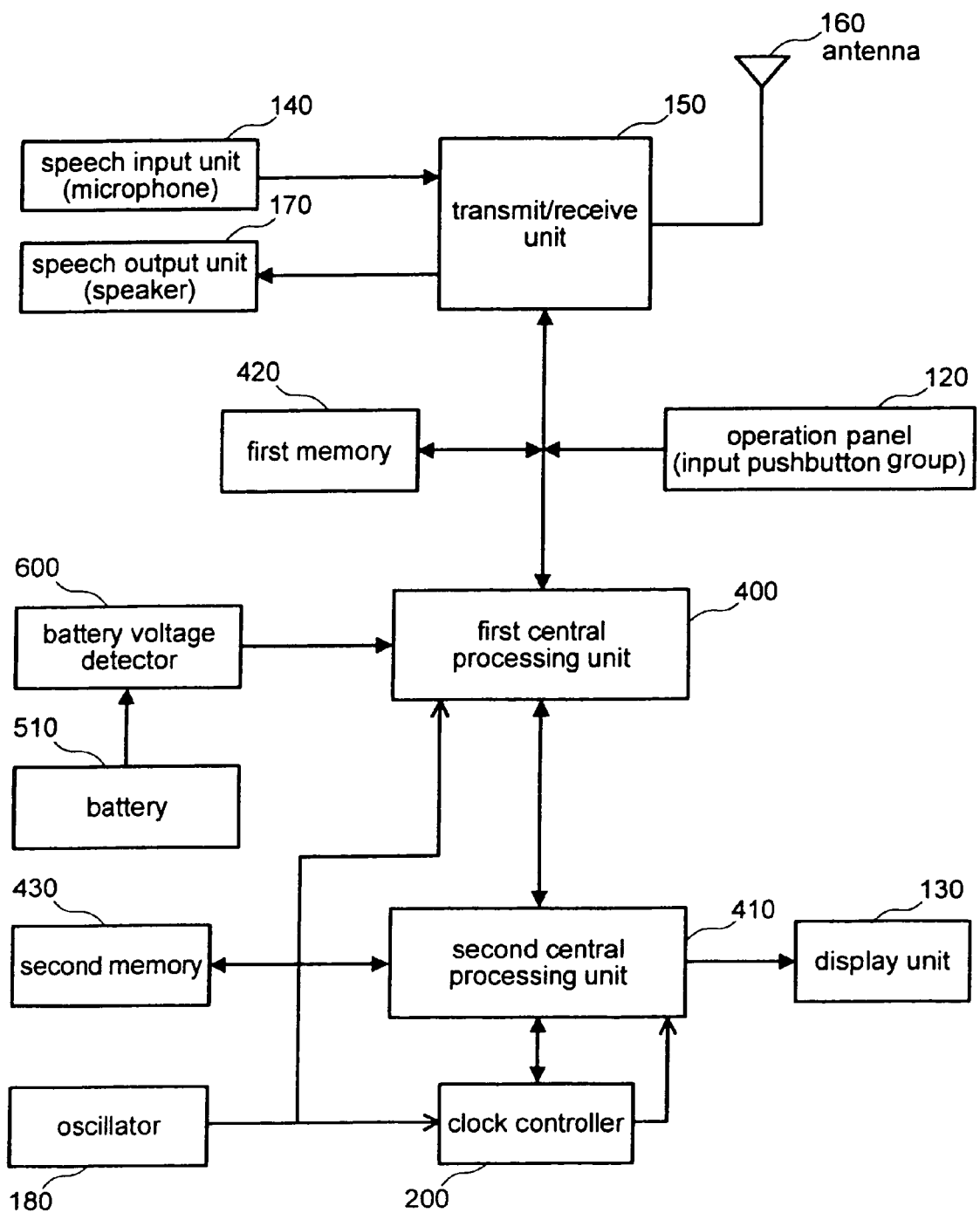
FIG. 3 is a block diagram showing the configuration of a third embodiment of a cellular phone according to the invention.

The cellular phone shown in FIG. 3 comprises a battery voltage detector 600 in place of the power supply controller 500 incorporated in the cellular phone shown in FIG. 2. In FIG. 3, blocks denoted by the same reference numerals as those in FIG. 2 have the same functions as those of the blocks of the second embodiment, omitting therefore description thereof.

The battery voltage detector 600 detects a voltage of a battery 510. A first central processing unit 400 determines whether or not the voltage detected is lower than a predetermined value. In the case where it is determined that the amount of the actual battery capacity that remains in the battery 510 is less than a predetermined amount, the frequency of a clock signal delivered to a second central processing unit 410 is changed to a lower frequency even when executing a specific processing, thereby reducing current consumption. Hence, it is possible to effect control so as to reduce current consumption in case that the amount of the actual battery capacity that remains in the battery becomes small, thereby prolonging operable time of the cellular phone.

Figure 4:
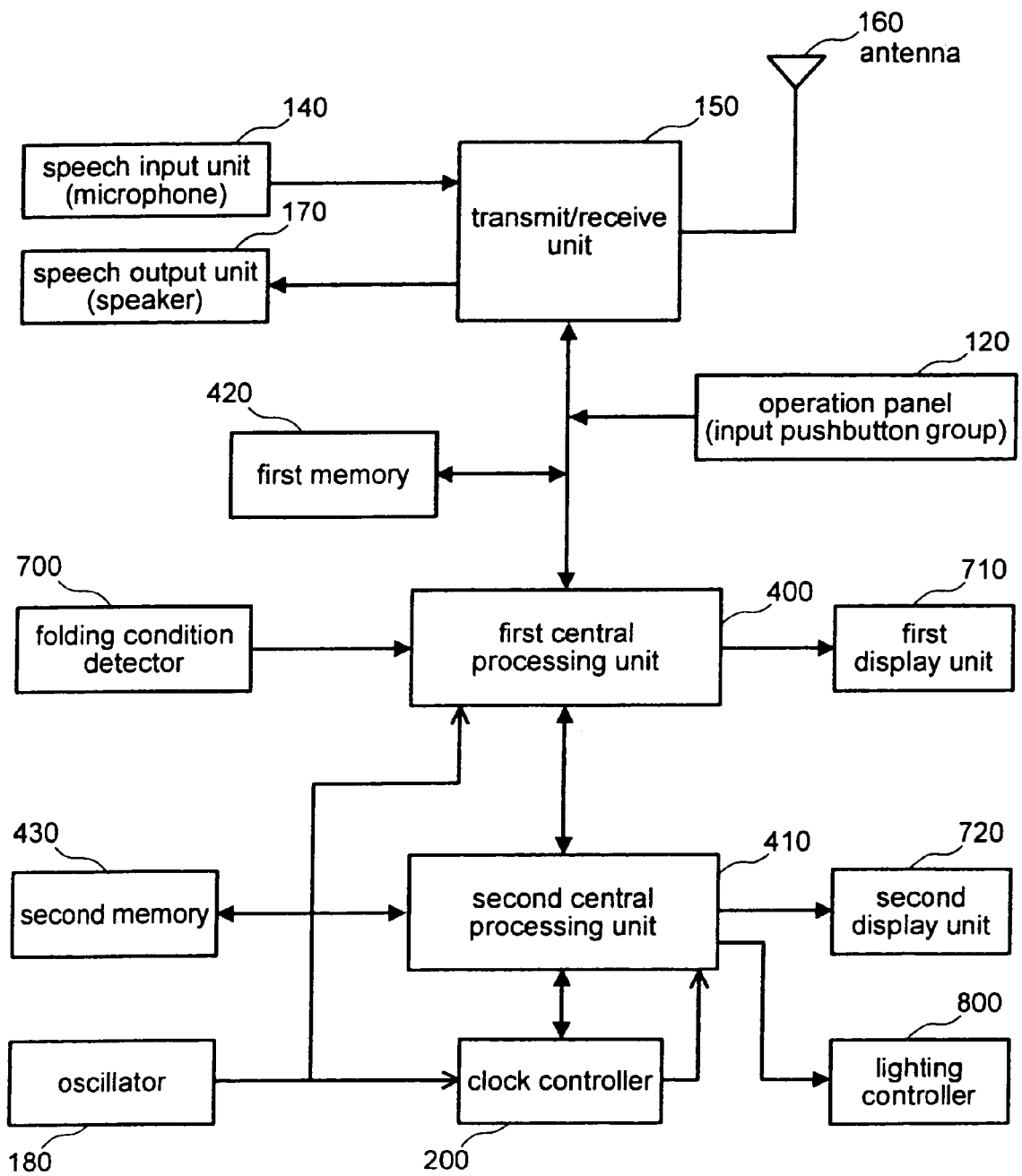
FIG. 4 is a block diagram showing the configuration of a fourth embodiment of a cellular phone according to the invention.

Further, a fourth embodiment of a cellular phone according to the invention is described hereinafter with reference to FIG. 4. FIG. 4 is a block diagram showing the internal configuration of the cellular phone of a folded structure, according to the fourth embodiment. In FIG. 4, blocks denoted by the same reference numerals as those in FIGS. 2 and 3, respectively, have the same functions as those of the blocks of the second and third embodiments, respectively, omitting therefore description thereof.

The cellular phone shown in FIG. 4 comprises a folding condition detector 700 for detecting whether the cellular phone is in a folded (closed) condition or in an unfolded (open) condition.

With the cellular phone according to the present embodiment, a first display unit 710 and a second display unit 720 are added to a first central processing unit 400 and a second central processing unit 410, respectively. The first display unit 710 is disposed at a position as can be seen by a user even in the folded condition. The second display unit 720 is disposed at the folded-down side of the cellular phone.

Since the operation of the cellular phone in the open condition is the same as that of the cellular phone according to the second and third embodiments, respectively, the operation of the cellular phone in the closed condition is described hereinafter.

Normally, in the closed condition, the cellular phone is often on standby (waiting) for cellular phone communications, and the first central processing unit 400 is in intermittent operation to receive radio waves from the outside via an antenna 160, executing processing for recognition through the intermediary of a transmit/receive unit 150 that the radio waves received are radio waves corresponding to a telephone number dedicated to the present cellular phone. Meanwhile, since a load on the second central processing unit 410 is light at this point in time, the frequency of a clock signal delivered to the second central processing unit 410 can be changed to a low frequency, thereby reducing power consumption. When executing a specific processing even in the closed condition, the frequency of the clock signal delivered to the second central processing unit 410 is caused to change to a higher frequency, thereby enhancing a processing speed, and upon completion of execution of the specific processing, the frequency of the clock signal is caused to change to a low frequency, thereby reducing current consumption.

Further, in the closed condition, the user is unable to see the second display unit 720. Accordingly, as for processing concerning the second display unit 720, upon detection of the closed condition, the frequency of the clock signal delivered to the second central processing unit 410 is caused to change to a low frequency, thereby enabling current consumption to be reduced.

Furthermore, even when executing the specific processing, the frequency of the clock signal delivered to the second central processing unit 410 may be changed to a low frequency in the case of the closed condition. In the case of the cellular phone being in the closed condition, the user does not look at a display screen of the cellular phone, and is often in no hurry to do processing. Accordingly, in the case of the closed condition, processing can be executed while reducing power consumption by changing the frequency of the clock signal to a lower frequency. When the cellular phone is shifted to the open condition, the processing speed is enhanced by changing the frequency of the clock signal delivered to the second central processing unit 410 to a higher frequency.

The cellular phone shown in FIG. 4 further comprises a lighting controller 800 for controlling backlight of the second display unit 720. Since the user is unable to see the second display unit 720 in the folded condition, further reduction in power consumption can be attained by turning off the backlight of the second display unit 720.

In addition, the power supply controller 500 shown in FIG. 2 or the battery voltage detector 600 shown in FIG. 3 may be added to the cellular phone according to the present embodiment. In such a case, when the amount of the actual battery capacity that remains in the battery 510 is less than a predetermined amount, power consumption can be reduced and waiting time can be extended by implementing control such that the backlight of the second display 720 is turned off even in the open condition.

Still further, the operability of the cellular phone can be improved by providing the cellular phone shown in FIGS. 2 through 4, respectively, with the clock manipulation unit 300 shown FIG. 1, thereby enabling the user to change the frequency of the clock signal as with the case of the first embodiment. Also, the operation panel 120 may have the function of the clock manipulation unit 300.

The respective embodiments described hereinbefore may be carried out singly or in combination as appropriate.

With the embodiments described hereinbefore, the clock controller, the memories, and so forth are disposed outside of the central processing unit, however, these components together with the central processing unit may be integrated so as to be incorporated in one chip.

As described in the foregoing, with the embodiments of the invention, it is possible to attain both enhancement in the processing speed and reduction in the power consumption.

The foregoing invention has been described in terms of preferred embodiments. However, those skilled, in the art will recognize that many variations of such embodiments exist. Such variations are intended to be within the scope of the present invention and the appended claims.

The invention claimed is:

1. A mobile terminal capable of being changed from an open condition into a closed condition, comprising:
   a processor which executes program processing; and
   a clock controller capable of changing a frequency of a clock signal to be fed to the processor;
   wherein the clock controller controls the frequency of the clock signal so as to become a first frequency when the mobile terminal is in the open condition, and controls the frequency of the clock signal so as to become a second frequency lower than the first frequency when the mobile terminal is in the closed condition, and wherein the clock controller controls the frequency of the clock signal so as to become a frequency higher than the second frequency when a specific processing is executed even if the mobile terminal is in the closed condition, and controls the frequency of the clock signal so as to become the second frequency after the execution of the specific processing is completed.

2. The mobile terminal according to claim 1, wherein the specific processing is a processing having an effect on a response to a request from the user.

3. The mobile terminal according to claim 1, wherein the specific processing is an image decoding processing or an address retrieval processing or a character conversion processing.

4. The mobile terminal according to claim 1, further comprising an input unit which allows a user of the mobile terminal to set the frequency of the clock signal, wherein when the frequency is set by the user using the input unit, the first frequency is the frequency set by the user using the input unit.

5. The mobile terminal according to claim 4, wherein the user can set the frequency of the clock signal in every processing using the input unit.

6. The mobile terminal according to claim 1, further comprising a display which exhibits a display corresponding to the magnitude of the frequency of the clock signal.

7. The mobile terminal according to claim 1, wherein the mobile terminal has a folded structure.

* * * * *